United States Patent [19]

Steigerwald et al.

[11] 4,080,546
[45] Mar. 21, 1978

[54] BEAM SPLITTER FOR ELECTRON BEAM MACHINES

[75] Inventors: Karl Heinz Steigerwald, Starnberg; Dieter König, Munich-Neuaubing; Wilhelm Scheffels, Germering; Rudolf Speck, Olching; Wolfgang Stamm, Puchheim, all of Germany

[73] Assignee: Steigerwald Strahltechnik GmbH, Munich, Germany

[21] Appl. No.: 619,706

[22] Filed: Oct. 6, 1975

[30] Foreign Application Priority Data

Oct. 16, 1974 Germany .............................. 2449263

[51] Int. Cl.² .......................... H01J 1/46; H01J 1/52; H01J 17/04; H01J 17/12
[52] U.S. Cl. ................................... 313/348; 313/146; 313/237; 250/398
[58] Field of Search ............... 313/348, 338, 278, 146, 313/236, 237, 411, 412; 250/398

[56] References Cited

U.S. PATENT DOCUMENTS

| | | | |
|---|---|---|---|
| 2,336,895 | 12/1943 | Shelton et al. | 313/411 |
| 2,757,301 | 7/1956 | Jones et al. | 313/411 |
| 2,840,749 | 6/1958 | Goddard | 313/348 X |
| 2,937,316 | 5/1960 | Moose | 313/348 X |
| 3,247,420 | 4/1966 | Mayer | 313/338 X |
| 3,290,540 | 12/1966 | Atti | 313/146 |
| 3,433,955 | 3/1969 | Perry | 250/398 |
| 3,506,871 | 4/1970 | Hunt | 313/278 |
| 3,689,782 | 9/1972 | Epszein | 250/398 |
| 3,745,401 | 7/1973 | Stapleton et al. | 313/278 |

*Primary Examiner*—Saxfield Chatmon, Jr.
*Attorney, Agent, or Firm*—Andrus, Sceales, Starke & Sawall

[57] ABSTRACT

A beam splitter for electron beam machines with a beam splitter grid which is to be set crossways to the beam and which has a row of cross-pieces running next to one another with uniform spaces for shading the portions of beam striking it, where the cross-piece materials is replaceable in operation by cross-piece material not already acted on by the beam.

21 Claims, 8 Drawing Figures

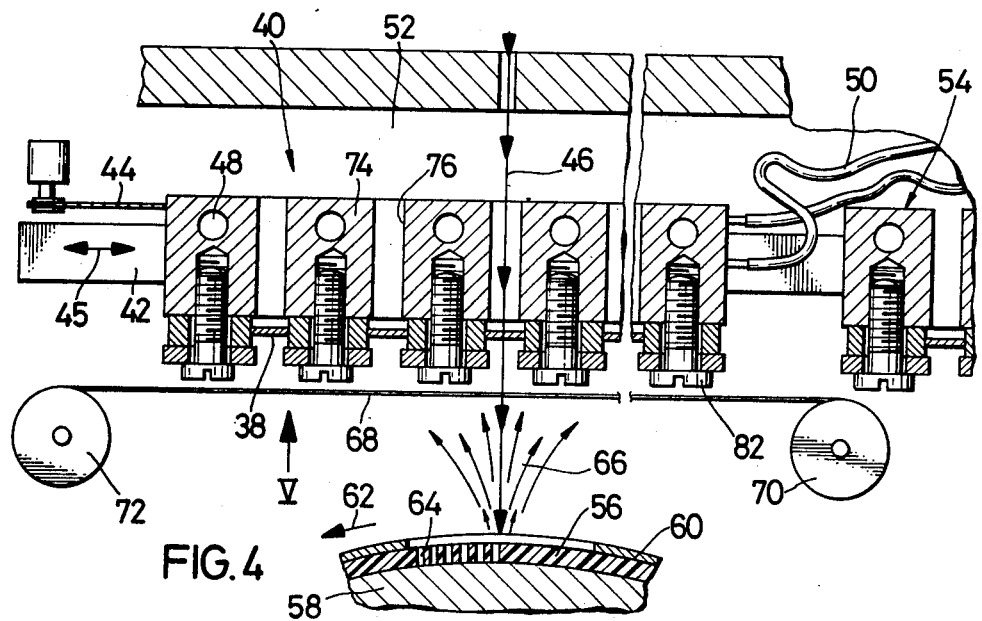
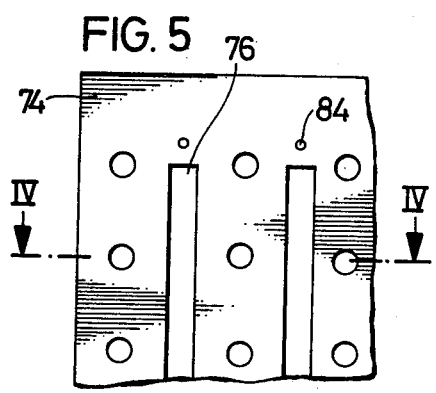
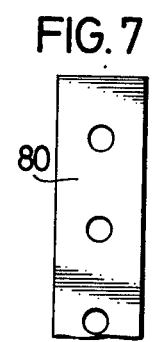
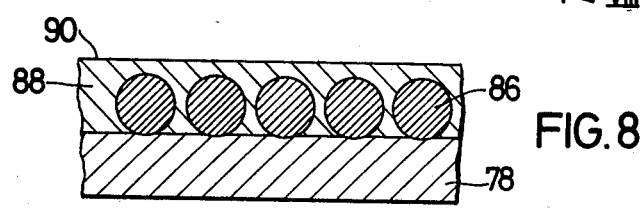

BEAM SPLITTER FOR ELECTRON BEAM MACHINES

BACKGROUND OF THE INVENTION

The invention relates to a beam splitter for electron beam machines with a beam splitter grid which is to be set crossways to the beam and which has a row of cross-pieces running next to one another with uniform spaces for shading the portions of beam striking it.

With the electron beam perforation of synthetic material, especially artificial leather, it is advantageous if work is carried out simultaneously with several individual beams. It is well known to subdivide an electron beam of relatively large cross-section by means of beam splitters; these beam splitters consist, in the simplest case, of sheets with a corresponding amount of holes. Generally, such beam splitters can be formed so that they consist of a number of cross-pieces, which shade the beams, and of a number of free spaces lying between the cross-pieces, through which corresponding amounts of the beam can penetrate. For mass perforation with a high work speed, it is especially practical to produce a line beam, to focuus this into a line-shaped focal spot on the place of work, and to set up a beam splitter in front of the place of work which subdivides the line beam into a quantity of individual beams with a roughly punctiform cross-section. With the high work speeds that material to be perforated is mostly moved continuously through the place of work, and the beam being deflected during the perforation impulse corresponding to the speed of movement of the material, the spaces between the cross-pieces are to be formed long enough to permit laterial beam movement.

The cross-pieces are heated so much by the beam portions striking them, that the danger of melting exists even with the use of a high melting point material such as tungsten. Moreover, the cross-pieces are contaminated by the waste-products collected during working. The relatively high temperature of the cross-pieces admittedlyy provides for a certain automatic cleaning; nevertheless, after a certain time, which for perforating synthetic products can total only minutes, so much material has been deposited on the cross-pieces that the required division geometry is no longer present. Such difficulties make numerous interruptions to work necessary which are troublesome and time-consuming on account of the vacuum necessary in the work chamber. For this reason, use has frequently not been made of the beam splitter.

SUMMARY OF THE INVENTION

An object of the invention is to produce a beam splitter which does not hinder an industrial continuous operation of service of an electron beam machine.

According to the invention there is provided a beam splitter of the type previously mentioned which is characterised in that the cross-piece material can be replaced in the operation by cross-piece material not already acted on by the beam.

Because the cross-piece material can be exchanged while the machine is operating, the contamination problems described can be controlled; moreover, it is possible to carry out the exchange proceedings so quickly that heating of the cross-piece material remains within tolerable limits.

One way of carrying out the invention is characterised in that the cross-piece length available in the cross-piece direction totals a multiple of the measurements of the beam cross-section taken in this direction, and the cross-pieces are movable in their direction. In this way new elements of the cross-piece material can be brought selectively into the beam striking area. In the simplest case, the cross-pieces consist of wire and can be moved further relative to a beam opening of a beam splitter main element. The entire grid of wires or cross-pieces lying side by side can thereby be formed in two different ways: in the first case, the cross-pieces can be made from parallel separated wire elements which are further movable together in their direction. Thus, with this design a type of wire comb is drawn further or wound and unwound. In the second case, several cross pieces are formed from a single wire, which is stretched over deflection devices to and fro across the beam openings. With this design one and the same elements of the wires are used several times, so that this design is especially suitable for applications, where the thermic problems are foremost; sufficient cooling of the wire can be easily provided by cooling of the deflection devices. With both possibilities of design the cross-pieces or wires can rest on the beam splitter main element and the main element can be coolable, so that an intensive cooling of the wires and the cross-pieces is secured in this way. In order to prevent wires from slipping, it is useful to provide the beam splitter main element with guideways for the wire.

A further possible design of the beam splitter according to the invention is characterised in that several beam splitter grids exchangeable with each other in the operation are provided for. This design will be mainly recommendable when the cooling problems are less considerable, for example, therefore when the individual beam splitter grids are each provided with cooling devices. The length of the operation of an individual beam splitter grid then depends on the contamination which is to be expected.

Especially mechanically simple is a design in which several beam splitter grids are arranged with uniform spaces in a common beam splitter unit, which is movable relative to the beam. Exchange of the individual beam splitter grids is easily carried out with this design by moving the entire beam splitter unit. A beam splitter unit of this type with several grids is also especially advantageous regarding cooling. It can stand as an entirety with a stationary cooling body in heat exchange and with further movement glide along this cooling body, or the beam splitter unit itself is provided with a cooling device, especially in the form of cooling canals, which can be supplied with a cooling agent across flexible tubes.

For especially long operating times, for example, a full shift time of 8 hours, for industrial mass perforation of artificial leather, it is useful if several of the described beam splitter units are provided for, each with several beam splitter grids, exchangeable with each other, and if they can be charged and discharged without interrupting the operation of the machine across an air-lock into the beam work space. With this design a first beam splitter unit which must be cleaned can be taken out of the apparatus across the air-lock and cleaned, without interrupting the operation, while a second beam splitter unit continues to work in the apparatus.

Since wear appears with the described beam splitter units essentially only at the cross-pieces of the beam splitter grids, it is useful to make the parts which are subject to wear, independently interchangeable; for this purpose the beam splitter unit has a main element with several beam openings corresponding to the beam cross-section, and the beam splitter grids are each formed as an insert which can be fastened to the main element so that it can be detached, under cover of the opening.

Also, it is easiest with the described beam splitter grids if the cross-pieces are formed from wires which are round in cross-section. This round cross-section of the cross-pieces also leads to a higher resistance to flow of the grid, which is useful on account of the relatively large quantities of gas which can be developed during working. This necessary high resistance to flow can also therefore generally be easily obtained because with most perforation operations the distance between the perforation holes to be produced is considerably larger than the diameter of a perforation hole : accordingly, the cross-piece width then totals, on the grid, a multiple of the cross-piece space.

Frequently it will be possible to increase the service life of the beam splitter by providing for a cleaning device for the cross-piece material removed by beam impact, so that this material can be used again after cleaning.

A considerable increase in the service life as well as in the resistance to flow can furthermore be obtained by providing for a screening foil in front of the side of the beam splitter turned away from the beam, which can be further transported and separated by the beam.

BRIEF DESCRIPTION OF THE DRAWINGS

The invention will now be further described, by way of example, with reference to the accompanying drawings, in which:

FIG. 4 is a completely schematic partly cut-away representation of another embodiment having an insert in an electron beam machine, where a beam splitter unit is shown in section along line IV—IV of FIG. 5;

FIG. 5 is a plan view in the direction of the arrow V of the beam splitter unit of FIG. 4, FIG. 6 is a plan view made likewise in the direction of the arrow V of FIG. 4 of a beam splitter insert of the type used in FIG. 4;

FIG. 7 is a plan view made likewise in the direction of the arrow V of FIG. 4 of a connecting strip used with the beam splitter unit according to FIG. 4; and FIG. 8 is an enlarged transverse section according to line VIII–VIII of FIG. 6.

DESCRIPTION OF THE PREFERRED EMBODIMENT

Figure 1:
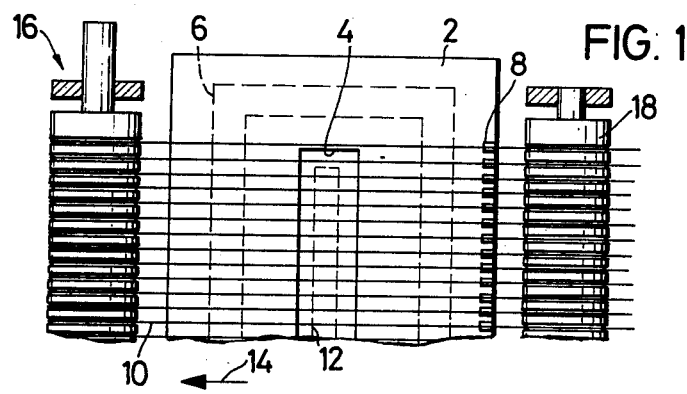
FIG. 1 is a schematic plan view of a beam splitter according to the invention.

The beam splitter shown in FIG. 1 contains a beam splitter main element 2, which can consist in particular of copper and has a beam opening 4. Out side the beam opening the main element is supplied with cooling canals 6, through which a cooling agent can be led. On the main element 2 are supported wire elements stretched parallel in guideways 8, which form cross-pieces of the beam splitter and extend straight over the beam opening 4. The cross-section of the electron beam to be split up is marked by the broken line 12. The wire screen formed from the wire elements 10 is moved further in the direction of the arrow 14 together with the help of a winding and unwinding device 16. The drive of the winding and unwinding device 16 is not shown. The wires 10 can be taken from a wound wire supply (not shown). On the righthand side of FIG. 1 a straightening roll 18 is shown, which is provided with guide grooves for the wires 10. The straightening roll can also be formed as a winding supply for the wire elements 10.

Figure 2:
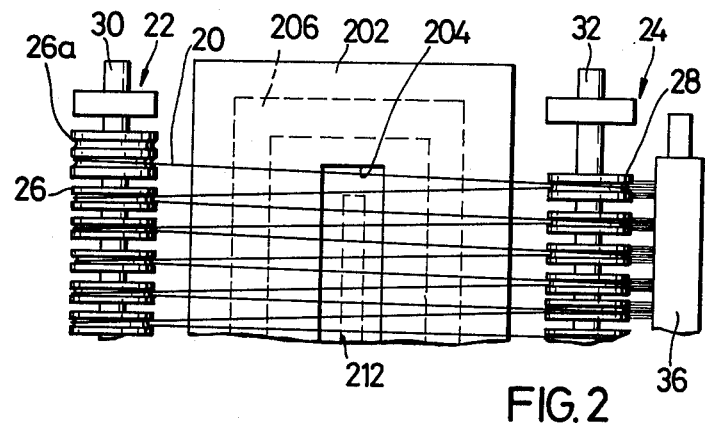
FIG. 2 is a similar plan view to FIG. 1 of another embodiment.

FIG. 2 shows a design which is similar to FIG. 1, but which does not use a screen of several parallel wire elements 10 but a single wire 20 which is stretched over deflection devices 22, 24 to and fro across the beam opening 204. Here also the beam splitter main element 202 can contain guide-ways for the wires; in the figure, however, such guideways are not shown. Also the beam splitter main element 202 is again provided with cooling canals 206. The electron beam cross-section is indicated by the broken line 212. According to FIG. 2, the deflection devices 22 and 24 each consists of several rollers 26 or 28, which are each mounted on a common shaft 30 or 32. The free end of the wire (not shown) 20 comes from a wire spool, and the beginning of the wire is fastened to the roller 26a of the deflection device 22, made as a wider winding spool. It is also possible to use a uniform roll instead of the individual rollers. A roll of this type 34 is shown in FIG. 3 in axial section.

Since with the design according to FIG. 2 one and the same elements of the wire extend frequently over the beam opening 204, and are therefore used repeatedly, a cleaning device 36 is provided for in the form of a wire brush on the right-hand side of deflection device 24. During operation the wire 20 is transported further continuously or intermittently by turning the shaft 30, so that the cross-pieces made from the wire are moved further across the beam opening 204 in its direction, whereby the cross-piece material which has in each case been impacted is exchanged.

Figure 3:
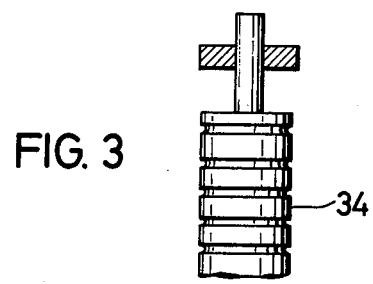
FIG. 3 shows another example of a deflection device for use with the beam splitter of FIG. 2.

For the purpose of better cooling, it is also possible to design the deflection device as coolable; this may be achieved with roll-type deflection devices according to the type of roll 34 shown in FIG. 3.

FIG. 4 shows a design with which several beam splitter grids 38 with uniform distance are arranged in a common beam splitter unit 40. This unit 40 is movable on a rail 42 with the help of a chain drive 44 relative to the beam in the direction of the arrow 45, so that through this several beam splitter grids 38 can be inserted one after the other in the operation as beam splitters at beam 46. The beam splitter unit 40 is provided with a cooling device, which consists of cooling canals 48 and flexible connecting tubes 50. The tubes are led vacuum tight from the work chamber 52 and serve to lead in and draw off a cooling agent. Instead of, or as well as, this, the beam splitter unit 40 can also be cooled through contact with the rail 42; in this case the rail 42 is formed as a stationary cooling body, which stands in heat exchange with unit 40.

In the work chamber 52 a further beam splitter unit 54 is provided for on the rail 42, which is formed like the first beam splitter unit 40 and is exchangeable with this. Furthermore, an air lock, not shown, is provided for, over which the beam splitter unit which is no longer being used and has to be cleaned can be removed from the work chamber 52, without the operation having to be interrupted. In the same way, a cleaned beam splitter unit can then be led again into the work chamber 52 over the air lock (not shown). The design of such charging and discharging devices presents no problem to those skilled in the art and a fuller description will not be given here.

The electron beam 46 shown in FIG. 4 is to be imagined with a line or band-shaped cross-section, of which the largest dimension stands vertical to the drawing plane. Beam 46 split into individual beams through the beam splitter grid 38 lying in each beam path strikes a workpiece 56 to be perforated which is fixed to a cylindrical workpiece support 58 with the help of a template 60, and through turning of the workpiece support 58 is moved further in the direction of the arrow 62. Beam 46 is also moved by deflection devices not shown, so that with every impulse an essentially straight perforation bore 64 is formed. The dirt 66 discarded from the place of work during perforation is mostly collected by a screening foil 68, which is arranged in front of the side of the beam splitter turned away from the beam. The screening foil 68 is unwound by a supply roller 70 on to a receiver roller 72 continuously or intermittently. The foil is so thin that it is penetrated by the beam without appreciable impairment of the beam intensity.

The construction of the beam splitter units 40 and 54 shown in FIG. 4 is further illustrated in FIGS. 5 to 8. The beam splitter unit 40 has a main element 74, which consists of copper in particular and has several beam openings 76 corresponding to the beam cross-section. Every beam splitter grid is formed in an insert 78 which can be fixed, so that it is detachable, to the main element 74 under cover of an opening 76. For this purpose, connecting strips 80 are provided for which are fixed with screws 82. For exact positioning, cavities 84 are provided for in the main element, which work together with corresponding increases (not shown) at insert 78.

As FIG. 8 shows, the cross-pieces in the design shown consist of wires 86 with a round cross-section, whereby the cross-piece width totals a multiple of the cross-piece space. The wires are fixed onto the insert 78 with hard solder 88, of which the top surface 90 is worked smooth.

With a practical design of the beam splitter device shown in FIGS. 4 to 8 for an electron beam machine for perforating artificial leather the cross-piece width can lie in the region of 0.4 to 1.5 mm, and the cross-piece spaces can total 0.05 to 0.2 mm. The space of the beam splitter cross-pieces from the work-piece 56 to be worked can lie in the region of 2 to 15 mm. According to the type of insert, other values are of course possible.

The cross-pieces consisted of tungsten wire of 2 mm diameter and in the operation reached a temperature of up to 2000° C. Cooling was so designed that the cooling water circulating through the cooling canals always had a temperature below 100° C. By using the screening foil 68 the service life per beam splitter insert was increased to approximately eight to ten times the value without screening foil. With the electron beam perforation of artificial leather it was possible to work in this way in a continuous operation with a service life of approximately 20 minutes per beam splitter insert.

Beam splitter units removed from the work chamber 52 can be cleaned with a high pressure water jet, whereby effective abrasive cleaning agents can also be added if necessary.

What is claimed is:

1. An improved beam splitter for an electron beam machine having a source generating an electron beam for providing bombardment of a target placed in the path of the beam resulting in physical treatment of the target, said beam splitter being insertable along the path of the beam between the electron beam source and the target for mechanically blocking segments of said beam to provide a desired pattern of bombardment on the target, said beam splitter including:

a plurality of spaced crosspiece members having portions extending across the path of the beam for being struck by the electron beam to block corresponding segments thereof; and means for replacing crosspiece member portions being struck by the electron beam with additional crosspiece member portions not being struck by the beam.

2. A beam splitter as claimed in claim 1 wherein said cross-piece members are elongated and said replacement means is further defined as means for moving said cross-piece members through the electron beam along their length to provide said replacement.

3. A beam splitter as claimed in claim 2, in which said cross-piece members are of wire and said beam splitter has a frame providing a beam opening across which said cross-piece members are relatively movable by said replacement means to extend portions thereof across the path of the beam.

4. The beam splitter as claimed in claim 3 in which said cross-piece members are made from a plurality of parallel separated wire elements which are simultaneously movable along their length by said replacement means.

5. A beam splitter as claimed in claim 3, in which said cross-piece members are formed from a single wire and deflection devices are provided over which said wire is stretched to and fro across said beam opening.

6. A beam splitter as claimed in claim 5, in which said deflection devices are coolable.

7. A beam splitter as claimed in claim 3, in which winding and unwinding devices for said wire are provided.

8. A beam splitter as claimed in claim 3, in which said wire rests on said beam splitter frame and said beam splitter frame is coolable.

9. A beam splitter as claimed in claim 3, in which guideways for said wire are provided for said beam splitter frame.

10. A beam splitter as claimed in claim 1 wherein the width of said cross-piece members exceeds the dimension of the spacing between them.

11. A beam splitter as claimed in claim 1 wherein said cross-piece member portions are formed in a plurality of separate grid structures and said replacement means comprises means for sequentially inserting said grid structures in the path of the electron beam.

12. A beam splitter as claimed in claim 11 wherein said beam splitter includes a frame in which at least a pair of beam splitter grids are spacedly arranged, said frame being movable relative to said beam by said replacement means.

13. A beam splitter as claimed in claim 12, in which said beam splitter frame is coupled in heat exchange relationship with a stationary cooling body.

14. A beam splitter as claimed in claim 12, in which a cooling device is provided for the beam splitter frame.

15. A beam splitter as claimed in claim 14, in which cooling channels are provided in said cooling device for being supplied with a cooling agent by means of flexible tubes.

16. A beam splitter as claimed in claim 12, in which said beam splitter frame has a main element with several beam openings corresponding to the beam cross-section, and said beam splitter grids are each formed in an insert, which is detachably fastenable to said main element across an opening.

17. beam splitter as claimed in claim 12, in which said cross-pieces are formed from wires which are circular in cross-section.

18. A beam splitter as claimed in claim 12 including a plurality of beam splitter frames, each provided with a plurality of grids, said replacement means comprising means for sequentially inserting said frames in the path of said electron beam and for charging and discharging said frames across an air lock of said machine in and out of the beam work space without interrupting the operation of the machine.

19. A beam splitter as claimed in claim 1 including a cleaning device for the replaced cross-piece member portions and wherein said replacement means further includes re-use means for reinserting the cleaned cross-piece member portions in the electron beam.

20. A beam splitter as claimed in claim 1, in which a screening foil is provided for in front of the side of the beam splitter turned away from the beam, which can be adapted to be further transported and with respect to said beam.

21. A beam splitter as claimed in claim 1 wherein said cross-piece members are uniformly spaced.

* * * * *